April 14, 1970 N. F. COATES 3,506,285
WELD END FITTINGS

Filed Sept. 19, 1966 4 Sheets-Sheet 1

INVENTOR
NICHOLAS F. COATES

BY
*Strauch Nolan Neale Nies & Bronaugh*
ATTORNEYS

INVENTOR
NICHOLAS F. COATES

Strauch Nolan Neale Nees + Bronaugh
ATTORNEYS

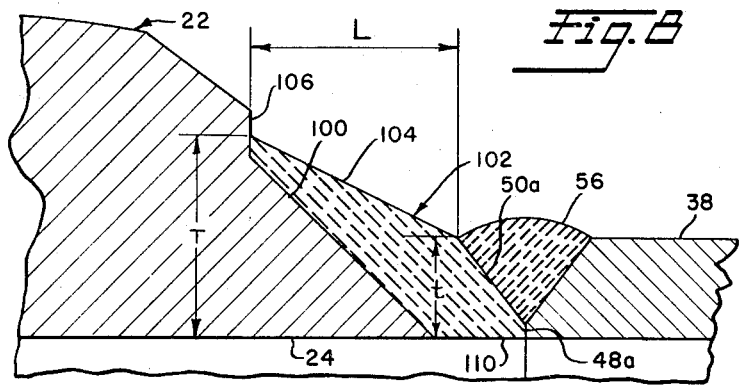
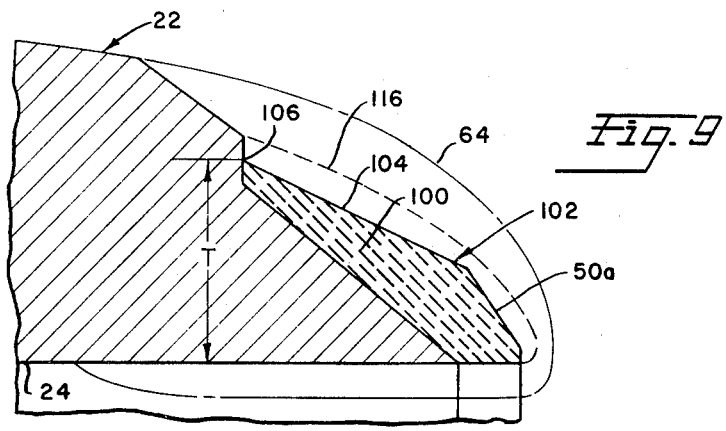
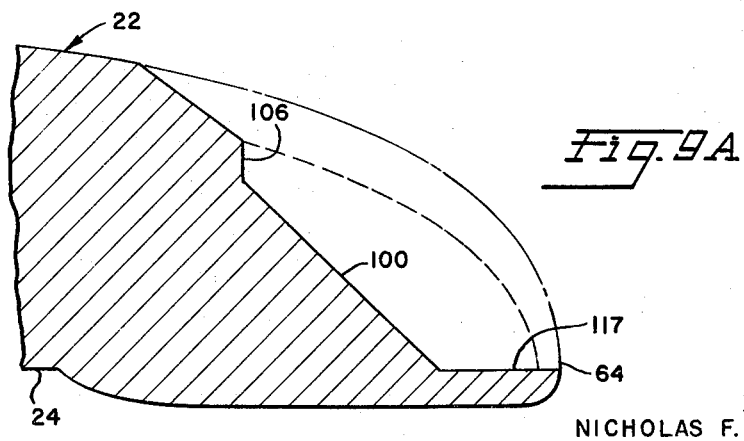

United States Patent Office 3,506,285
Patented Apr. 14, 1970

3,506,285
WELD END FITTINGS
Nicholas F. Coates, Aliquippa, Pa., assignor to Rockwell Manufacturing Company, Pittsburgh, Pa., a corporation of Pennsylvania
Filed Sept. 19, 1966, Ser. No. 584,044
Int. Cl. F16l 13/02
U.S. Cl. 285—173                              21 Claims

ABSTRACT OF THE DISCLOSURE

A fitting and method of making same wherein fluid inlet and/or outlet ends of the fitting, which are prepared for butt welding to a conduit or the like, are formed from weld metal and are fused to the cast or forged main body section of the fitting. In one embodiment the weld metal ends peripherally surround the end portions of the cast or forged body section.

---

This invention relates to butt welding, fluid flow conduit fittings and to methods of their construction. The term "fitting" as defined herein is intended to cover valve bodies as well as elbows, tees, crosses, pipe flanges, blinds, and other fluid pressure containing parts which are adapted to be connected to a pipeline or the like.

When butt welding a fitting to a straight section of pipe, it is important that the weld joint be at least equal in strength to the straight pipe section. As a result, the product of section thickness at the "fitting end" and the yield strength at the fitting end of the weld is required to be at least equal to the product of the pipe wall thickness and the yield strength of the pipe. To meet this requirement for butt welding the usual cast or forged fitting to the present-day alloy pipe of considerably higher strength, the section thickness at the fitting end of the weld must be greater than the pipe wall thickness.

The butt welding of fittings to adjoining pipes having smaller wall thickness normally must conform to dimensional standards which often result in objectionable complications. The American Standard Code For Pressure Piping, for example, provides that the weld transition between ends of unequal thicknesses should have a slope which is not greater than 1:3 or approximately 18 degrees. This imposes a definite limitation on the ratio of fitting thickness to pipe wall thickness which can be joined with standard weld bevels. In addition, making a weld with a sloping surface is considerably more difficult than making a flat weld.

Where the thickness ratio is such that the slope of a transition butt weld would exceed the 1:3 ratio specified by the American Standard Code For Pressure Piping, it has been necessary prior to this invention, to use an intermediate piece, which is commonly referred to as a "pup." This is a costly expedient, since the "pup" requires special fabrication and machining. Also, pups require an additional weld to be made, thus further contributing to increased costs in constructing a pipeline system.

The present invention overcomes the problems involved in welding ends of dissimilar thicknesses by providing a novel fitting with one or more weld metal ends which are fused to the cast or forged fitting body and which are prepared for butt welding to a pipeline. The weld metal ends are comparable in strength to the alloy steel pipe and thus may be tapered to a thickness equal to the thickness of the adjoining pipe with no strength-matching problem. The weld metal ends mentioned above are built up to define the inlet and outlet openings of the fitting. According to this invention the weld metal ends peripherally surround the end portions of the main cast or forged body section of the fitting.

One novel method of making a weld end fitting according to this invention is, in brief, to first conventionally form the fitting by a suitable casting or forging operation. If the fitting is cast or forged with standard dimensions, the pipe connection end or ends, depending upon the type of fitting, is cut back to a region where the ratio of thickness of the casting or forging to the thickness of the connecting pipe is at least equal to the ratio of the minimum yield strength for the pipe to the minimum yield strength for the cast or forged fitting. The material that is cut off is then replaced with high strength alloy weld metal which is fused to the casting or forging to provide a built-up continuation thereof. The weld metal end in then finally prepared for butting welding to the pipeline.

It is, therefore, a major object of this invention to provide a novel fluid flow fitting and method of construction which eliminates the problems encountered with butt welding ends of unequal thickness.

A more specific object of this invention is to provide a novel fluid flow, cast or forged fitting which has one or more built-up, weld metal ends that are adapted for butt welding to an adjoining pipe or the like.

Still another object of this invenion is to provide a novel fluid flow fitting and method of construction wherein body and end sections of dissimilar materials are fused together to define a fluid flow passage between the inlet and outlet openings of the fitting.

Further objects of this invention will appear as the description proceeds in connection with the appended claims and the annexed drawings wherein:

Figure 7:
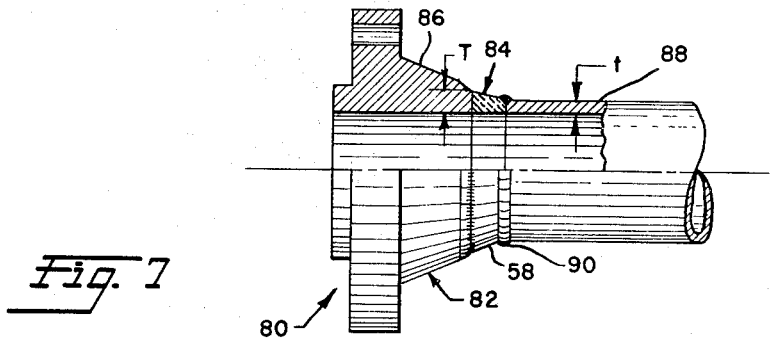
Figure 2:
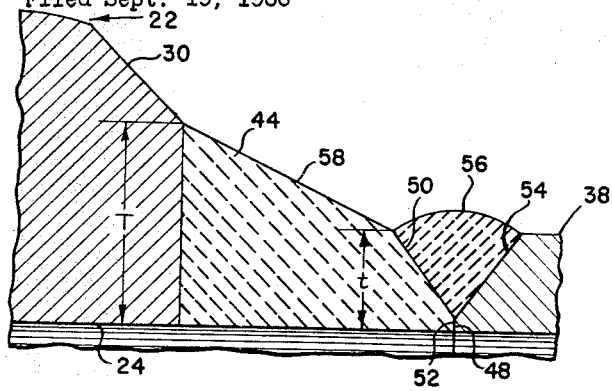
FIGURE 2 is a fragmentary, enlarged section of the right-hand end of the valve body shown in FIGURE 1.
Figure 4:
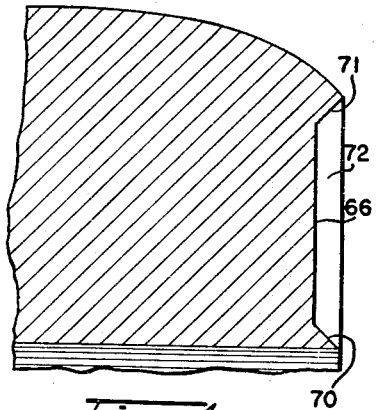
Figure 3:
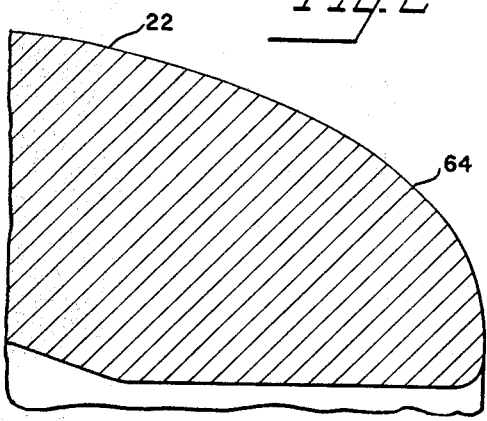
Figure 5:
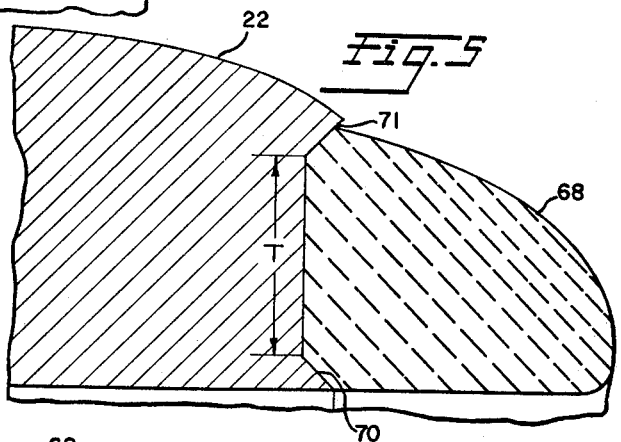
Figure 6:
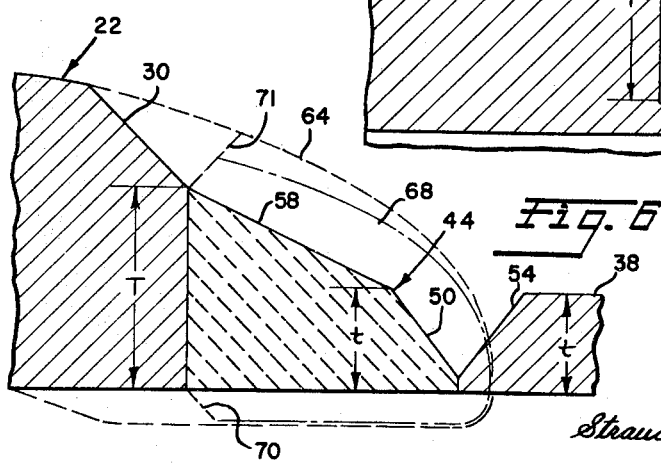
Figure 10:
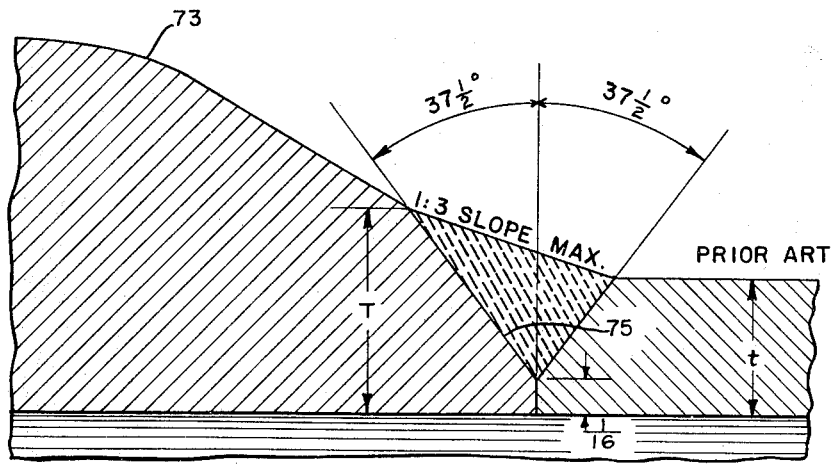

FIGURES 3, 4 and 5 which illustrate the enlarged right-hand end of the valve body in section, show the sequence of steps for forming the valve body according to one method of this invention;

FIGURE 6 is an enlarged, fragmentary composite view of FIGURES 2–5;

FIGURE 7 is a partially sectioned side elevation of a flange constructed in accordance with the principles of this invention;

FIGURE 8 is an enlarged framentary section similar to FIGURE 2, but showing a modified form of weld end fitting;

FIGURE 9 is an enlarged framentary composite section showing the sequence of steps for forming the weld end fitting of FIGURE 8;

FIGURE 9a is an enlarged fragmentary section showing the prepared end of the rough casting or forging preliminary to the application of weld metal for forming the weld metal end section illustrated in FIGURE 8; and FIGURE 10 is a fragmentary, enlarged section which is similar to FIGURE 2, but which shows a conventional fitting butt welded to the thinner pipe in accordance with the American Standard Code.

Figure 1:
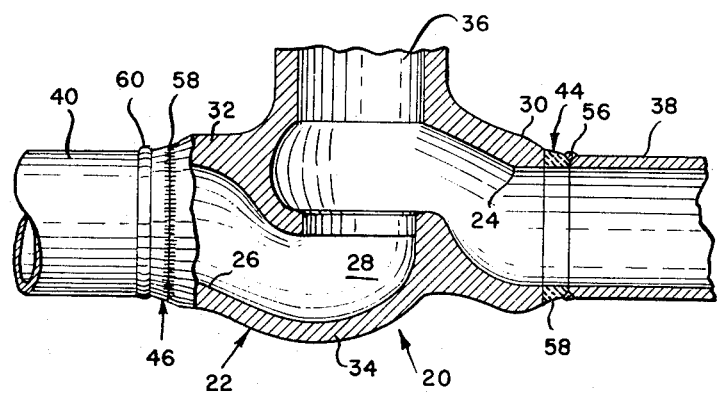
FIGURE 1 is a partially sectioned side elevation of a valve body constructed according to the principles of this invention.

Referring now to the drawings and more particularly to FIGURE 1, a valve body 20, constructed according to this invention, is shown to comprise a cast or forged central section 22 having the usual axially spaced apart, similar, cylindrical fluid flow passages 24 and 26 which open at their inner ends into an enlarged cavity or chamber 28. Body 20, in this embodiment, is for a two-way valve having an unshown valve member such as, for example, a plug which is received in cavity 28 and which is displaceable by manipulation of an unshown operating stem between positions where it blocks and provides fluid communication between passages 24 and 26. This invention, it will be appreciated, is not concerned with the construction of the valve closure member and stem assembly which may be of any suitable form such as that used, for example, in ball valves, plug valves, gate valves, check valves, and the like.

Still referring to FIGURE 1, section 22 is formed with the usual axially spaced apart tubular portions 30 and 32 which, in this embodiment, are integrally joined at their inner ends by an enlarged intermediate body portion 34. Tubular portions 30 and 32 respectively define passages 24 and 26, and portion 34 defines cavity 28. The unshown valve operating stem is adapted to extend through a suitable opening 36 which is medially formed in portion 34.

Preferably, the diameters of passages 24 and 26 are equal to the internal diameter of the pipe for which the valve body is sized. Section 22 may be formed by conventional forging or casting.

Since the minimum yield of the cast or forged valve body is less than that of high strength pipe, the thickness of section 22 especially in the region of tubular portions 30 and 32 is required to be considerably greater than the pipe thickness to conform to applicable standards. The minimum cast or forged fitting thickness indicated by the dimension T in FIGURE 2 may be determined by the following expression:

$$T_{min} = \frac{tS_p}{S_f}$$

where $t$ is equal to the thickness of the adjoining pipe, $S_p$ is equal to the minimum yield strength of the pipe, and $S_f$ is equal to the minimum yield strength of the cast or forged fitting which, in this embodiment, is section 22.

Usually, the outer ends of tubular portions 30 and 32 are tapered as shown in FIGURE 2 so that the smallest thickness is at the end of each portion conforming to the requirement that T is at least equal to the value obtained from the above equation. Under these conditions, the strength of body section 22 will be at least equal to the strength of adjoining pipes 38 and 40 which may be made from alloy steel or the like and have a smaller wall thickness as indicated at $t$.

To overcome the previously discussed problems in butt welding ends of dissimilar thicknesses, built-up, weld metal end sections 44 and 46 (see FIGURE 1) are respectively fused to the oppositely facing ends of tubular portions 30 and 32. End sections 44 and 46 are tubular and have substantially uniform internal diameters equal to that of tubular portions 30 and 32 to thereby define uniformly diametered continuations of passages 24 and 26 respectively.

As best shown in FIGURE 2, the end face of section 44 is prepared for butting to the adjacent end of pipe 38. This butt welding preparation may be standard and is shown to comprise a planar annular shoulder surface 48 which axially faces the end of pipe 38 and which extends radially from the cylindrically smooth internal wall surface of section 44. Shoulder surface 48 is contained in a plane that normally intersects the longitudinally axis of pipe 38 and has a short radial length of about 1/16 of an inch. As shown, shoulder surface 48 is joined to a surface 50 which is contained in a conical envelope. In the plane of FIGURE 2, the line defining surface 50 extends at an acute angle with the radial plane containing shoulder surface 48. This acute angle preferably is about 37 degrees. Surface 50 extends rearwardly from surface 48 to a region where the thickness of section 44 is equal to the thickness $t$ of pipe 38.

The adjacent end of pipe 38 is similarly prepared for butt welding and has opposing radial and conical surfaces 52 and 54 which are in mirror image relation to surfaces 48 and 50 respectively. Surfaces 48, 50, 52, and 54 are contoured and dimensioned to preferably meet ASA standards and provide for an annular, V-shaped butt weld groove in a manner well known in the art.

A V-type butt weld 56 is provided between the prepared ends of section 44 and pipe 38 in any suitable, conventional manner. For example, weld 56, which is formed in a ring, is obtained by an arc welding or other fusion process wherein the opposed ends of section 44 and pipe 38 are heated to a molten state in the presence of filler metal obtained by melting a welding rod or wire in the arc to form weld 56. Weld filler rod or wire must be so constituted as to deposit weld metal having a strength at least equal to the strength of the joined materials.

Since the weld deposit is equal in strength to the metal of the pipe, the minimum thickness of section 44 in the region where weld 56 terminates may be made to be equal to the thickness of pipe 38. The necessity of providing weld 56 with a slope or using a pup, as is the case when ends of dissimilar thicknesses are butt welded, is therefore eliminated. With the fitting of this invention, the weld may conveniently and easily be made since the thicknesses at the ends of section 44 and pipe 38 where surfaces 50 and 54 terminate are made equal, and the surface of the weld is flat as in pipe-to-pipe welds.

Still referring to FIGURE 2, the thickness of section 44 at the region where it fuses to the axially facing end surface of tubular portion 30 is equal to thickness T. Between the end of tubular portion 30 and the region where surface 50 terminates, section 44 is formed with a peripheral surface 58 which is contained in a conical envelope to provide a smooth, uniformly sloped transition between the inner end of section 44 having the larger thickness T and its intermediate region having the thickness $t$. It is clear that after the butt weld is made, section 44 has a minimum thickness $t$ (the same thickness as pipe 38) in a radial plane passing through the juncture of surfaces 50 and 58. The slope of the line defining surface 58 in the longitudinal section of FIGURE 2 is less than the slope of the intersecting line defining surface 50.

As shown in FIGURE 1, section 46 is identical to section 44, with like reference numerals being applied. Also, the opposed ends of section 46 and pipe 40 are prepared for butt welding in the same manner as described for section 44 and pipe 38. The weld joining section 46 to pipe 40 is indicated at 60.

To make valve body 20, section 22 is first cast or forged by suitable, conventional methods and with the standard dimensions that it would normally have in absence of the modifications provided by this invention. This casting or forging, as shown in its preliminary, unmodified form has extended, thick tubular ends 64 (one shown in FIGURE 3) which, according to conventional practice, would be machined for welding to an adjoining pipe.

In accordance with the present invention, however, ends 64 are cut away to a point such that the wall thickness of the casting or forging at the weld juncture after final machining will be at least equal to the value T as shown in FIGURE 4. This may be done by rough machining to provide section 22 as shown preparatory to the application of weld metal for building up sections 44 and 46. In this embodiment, the ends of the casting or forging are machined off to provide flat annular end faces 66 (one shown in FIGURE 4) which are contained in radial planes normally intersecting the longitudinal axes of passages 24 and 26 respectively.

It will be appreciated that section 22 alternatively may be cast or forged without ends 64 and thus with substantially the finished dimensions shown in FIGURES 1, 2, and 4–6. This, however, requires the use of special patterns which are sized and dimensioned to eliminate ends 64. On the other hand, use of conventionally dimensioned patterns, which result in the formation of ends 64, avoids the need for special equipment.

If section 22 is cast, it preferably should conform to the ASTM specification A–216, Grade WCB. This specification is entitled "Carbon-Steel Castings Suitable for Fusion Welding for High-Temperature Service" and covers carbon steel castings for valves, flanges, and other fittings. An example of the composition of such fittings is provided in Table I which appears in paragraph 7 of Specification A-216 and which is as follows, the proportions being by weight:

TABLE I.—CHEMICAL REQUIREMENTS

|  | Grade WCB |
|---|---|
| Carbon, max., percent | 0.30 |
| Manganese, max., percent | 1.00 |
| Phosphorus, max., percent | 0.05 |
| Sulfur, max., percent | 0.06 |
| Silicon, max., percent | 0.60 |
| Residual elements: |  |
| Copper, max., percent | 0.50 |
| Nickel, max., percent | 0.50 |
| Chromium, max., percent | 0.40 |
| Molybdenum, max., percent | 0.25 |
| Total content of these residual elements, max., percent | 1.00 |

Forged fittings suitable for this invention preferably conform to ASTM Specification A-105 Grade II, entitled "Forged or Rolled Steel Pipe Flanges, Forged Fittings, and Valves and Parts for High Temperature Service." The chemical requirements for such forgings appears in paragraph 4 of Specification A-105 and are as follows:

TABLE I.—CHEMICAL REQUIREMENTS

|  | Grade II |
|---|---|
| Carbon, max., percent | 0.35 |
| Manganese, max., percent | 0.90 |
| Phosphorus, max., percent | 0.05 |
| Silicon, max., percent | 0.35 |
| Sulfur, max., percent | 0.05 |

After the forged or cast body section 22 is formed with the dimensions shown in FIGURE 4, sections 44 and 46 are formed by first fusing and building up enlarged, tubular, weld metal end sections 68 (one shown in FIGURE 5) onto the tubular portions 30 and 32. Sections 68 may be applied by any suitable, conventional fusion welding process such as electric-arc welding. The metal for forming sections 68 is obtained by melting a welding rod or wire in the arc.

Preferably, each weld metal section is applied by first fusing a circular bead of weld metal to end face 66. It is understood that the end of section 22 is heated to a molten state so that it flows and fuses with the melting welding electrode. The thusly formed weld metal bead is then overlaid by successively applied weld metal beads to build up section 68, with each bead being fused to the previously applied bead. The heat required to fuse the initial weld metal bead to section 22 is localized and is applied for a relatively short period. These factors, among others, preclude objectionable overheating of section 22.

To start the build up of weld metal on each end face 66, end 64 advantageously is machined to provide inner and outer annular walls 70 and 71 extending axially forwardly from the inner and outer peripheries of end face 66 to define therewith an axially opening annular recess 72. When section 22 is turned to an upstanding position, therefore, recess 72 defines an upwardly opening receptacle to receive the initial build up of weld metal. The radial dimensional of end face 66 extending between walls 70 and 71 is equal to T.

In composite view of FIGURE 6, the outline of the cast or forged end 64 is shown in dashed lines, the outline of end section 68 is shown in dotted and dashed lines, and the finally formed weld metal end section 44 is shown in solid lines. As illustrated, end sections 68 are somewhat larger than sections 44 and 46.

After sections 68 are formed, they are machined down to the finished dimensions of sections 44 and 46 as shown in FIGURES 2 and 6. During this final machining step, walls 70 and 71 are removed and the ends of sections 44 and 46 may be prepared for butt-welding in the manner previously described.

The material for forming end sections 44 and 46 preferably is made from proprietary welding rods of the low carbon, high manganese type. A typical analysis of this type of welding rod is as follows, the percentage being by weight:

|  | Percent |
|---|---|
| C | 0.08 to 0.12 |
| Mn | 0.8 to 1.40 |
| Si | 0.5 to 0.6 |
| P and S, max. | 0.20 |

FIGURE 10 illustrates the conventional method of butt welding a cast or forged fitting 73 to pipe 38 where the slope of the weld, as indicated at 74 does not exceed the aforementioned 1:3 slope. As shown, the product of the section thickness T at the fitting end of weld 74 and the yield strength at the fitting end is required to be at least equal to the product of the pipe wall thickness $t$ and the yield strength of pipe 38. FIGURE 8 thus clearly illustrates the limitation which the 1:3 weld slope imposes upon the ratio of fitting thickness to pipe wall thickness.

FIGURE 7 illustrates a butt welding flange 80 constructed according to this invention and having a one-piece, cast or forged body section 82 and a weld metal end section 84. Section 82 is formed with the usual tubular, fluid flow conduit portion 86 which is fused to end section 84. Section 84 is essentially identical to sections 44 and 46, like reference numerals being applied.

As shown, section 84 forms a built-up, tubular extension of portion 86 and has a minimum wall thickness $t$ which is equal to that of the adjoining pipe 88. The outer periphery of portion 86, which is contained in a conical envelope, has a minimum thickness T at its end face where it is fused along an annular interface to section 84. Thickness T is determined by the same equation used for determining the minimum thickness of body section 22.

The cast or forged body section 82 may be formed in the same manner as section 22. If formed with standard dimensions, the pipe connection end of portion 86 is machined off to a region where the wall thickness is at least equal to the value T as shown. Section 84 is then built-up on the prepared end of portion 96 as previously described and is thereafter machined to finished form with its pipe connection end prepared for butt welding to pipe 88. As shown, the internal diameters of sections 82 and 84 and pipe 88 are substantially equal and axially aligned.

A weld 90 joining flange 80 to pipe 88 may be provided by the usual fusion electric-arc welding process wherein the adjacent ends of section 84 and pipe 88 are heated to a molten state. The filter material forming the weld is provided by a welding rod or wire which is melted in the arc and fused with the molten metal from end section 84 and pipe 88.

In the embodiment shown in FIGURE 8, the cast or forged body section, instead of being formed with the radial faces 66, is machined from the rough casting or forging of FIGURE 2 to provide an annular, sloping surface 100 at each end. Surface 100, which is contained in a conical envelope, tapers uniformly towards the end of section 22 to a point where it intersects the interior cylindrical wall surface defining passage 24. In place of sections 44 and 46, built-up weld metal fitting end sections 102 (one shown) are fused to section 22 along each surface 100.

Still referring to FIGURE 8, each end section 102 has a tubular configuration and peripherally and coaxially surrounds the end portion of section 22 on which surface 100 is formed. The outer peripheral surface of end section 102, as indicated at 104, is cylindrical and is contained in a conical envelope. Surface 104 slopes uniformly but more gently than surface 100. The thickness of end section 102 thus uniformly increases towards the fitting end of body 20.

In this embodiment, body section 22 is formed with an annular, radial shoulder 106 extending outwardly from surface 100. Shoulder 106 provides a support surface to facilitate the convenient build up of weld metal in forming end section 102 as will presently appear. End section 102 is fused to shoulder 106 along an interface that extends essentially radially of passage 24.

As shown, the thickness of end section 102 at shoulder 106 is preferably equal to the intermediate region where the weld metal forming section 102 has been diluted with the lower strength cast or forged metal as a result of fusion welding the weld metal of section 102 to body section 22. This region of dilution is an annular area 108 having an outer periphery which is sloped parallel to surface 100 and which extends from the juncture of surface 104 with shoulder 106.

The fitting end of section 102, which extends coaxially beyond section 22, is formed with a uniformly diametered, interior, cylindrically smooth wall surface 110. Wall surface 110 axially aligns with and has the same diameter as the passage forming wall surface of section 22 to define a smooth, uninterrupted continuation of passage 24. Surface 110 thus delimits each fluid opening in body 20.

With continued reference to FIGURE 8, the end face of each section 102 is prepared for butt welding to the adjacent pipe end. This butt welding preparation is the same as that described in the embodiment of FIGURES 1-6. Accordingly, like reference numerals suffixed by the letter a have been applied to designate like surface of preparation.

As shown, surface 50a intersects surface 104 at an acute angle and preferably at a point which closely radially aligns with the point where the outer periphery of area 108 intersects surface 110. Thus, the radial thickness of undiluted weld metal contained in section 102 at the "fitting end" of weld 56 extends from the juncture of surfaces 50a and 104 to the juncture of surface 110 with the outer periphery of area 108. This radial thickness of undiluted weld metal in section 102 is made equal to the wall thickness $t$ of pipe 38.

As compared with the previous embodiments, the weld end fitting construction shown in FIGURE 8 reduces the amount of weld metal needed to form section 102. Furthermore, the weld end fitting of FIGURE 8 advantageously has a constant strength in cross section throughout its entire length as indicated by the dimension $l$. This unique characteristic can be mathematically established by first determining the related thicknesses of section 102 and of the end of section 22 containing surface 100.

The thickness of undiluted, high strength weld metal at any distance $x$ along the dimension $l$ is equal to $$t - \frac{x}{l}t$$

which can be rewritten as $$t\left(1 - \frac{x}{l}\right)$$

The corresponding thickness of the low strength casting or forging metal at any distance $x$ will be equal to $$\frac{x}{l}t$$

where T is the thickness of section 22 extending radially from the juncture of surface 104 with shoulder 106 to the internal wall surface defining passage 24.

The strength of the composite cross section of sections 22 and 102 along the dimension $l$ will therefore be equal to $$tS_1\left(1 - \frac{x}{l}\right) + TS_2\frac{x}{l}$$

where $S_1$ is the yield strength of the weld metal end section 102 and where $S_2$ is the yield strength of the cast or forged body section 22. Since $tS_1$ is equal to $TS_2$ as previously mentioned in connection with the embodiment of FIGURES 1-6, the foregoing equation for the composite cross section of sections 22 and 102 can be rewritten as $$tS_1\left[\left(1 - \frac{x}{l}\right) + \frac{x}{l}\right]$$

It is apparent that this last equation is equal to $tS_1$, a constant.

To make the weld end fitting of FIGURE 8, the rough casting or fitting is formed with or machined to the configuration and dimension shown in full lines in FIGURE 9a. Each section 102 is thereafter formed by first fusing and building up an enlarged, tubular sections 116 (one shown) as outlined in dashed lines in FIGURE 9. The method and weld metal used to form each section 116 is the same as that described for sections 68 in the embodiment of FIGURES 1-6.

Preferably, each section 116 is applied by first fusing a circular bead onto shoulder 106 in peripherally surrounding relation to surface 100 and then successively overlaying further beads one upon the other until section 116 is completely built up. Finally, the enlarged section 116 is machined to provide the dimensions and configuration of section 102. Advantageously, each cast or forged tubular end 64 is machined to provide an annular, axially extending lip 117. Lip 117 provides a support for the forward portion of weld metal that is applied axially beyond surface 100. As shown, lip 117 is cut away when passage 24 is bored to its finished dimension.

It will be appreciated that the fitting end construction of FIGURE 8 may be used to make the flange shown in FIGURE 7, as well as the valve body shown in FIGURE 1.

The invention may be embodied in other specific forms without departing from the spirit or essential characteristics thereof.

What is claimed and desired to be secured by Letters Patent is:

1. A fitting having fluid inlet and outlet openings and adapted to be butt welded to a fluid flow conduit structure having a predetermined yield strength and a predetermined wall thickness, said fitting comprising a first body section defining a fluid flow passage between said openings and being formed from a material having a yield strength that is less than said predetermined yield strength of said structure, and at least a second body section fused to said first section to provide an axial continuation thereof and defining one of said openings, said second section having an outer end prepared to define a portion of a groove for receiving weld metal in the form of a butt weld for joining the fused composite of said first and second sections to said structure, the wall thickness of the region of said first section extending axially beyond said second section being greater than said predetermined wall thickness of said structure to compensate for the difference between the yield strengths of said first section and said structure, said second section being formed from a material which is dissimilar as compared with that of said first section and which has a yield strength that is sufficiently greater than that of said first section so that the region of said second section axially adjacent to said butt weld and extending between said butt weld and said first section is formed with a wall thickness that is comparable to that of said structure and less than that of said first section in the region extending axially beyond said second section, said first and second sections being fused together at least mainly along an annular interface tapering toward the outer butt welding end of said second section whereby at least a part of said second section peripherally surrounds said first section.

2. A fitting having fluid inlet and outlet openings and adapted to be butt welded to a fluid flow guide structure of predetermined yield strength, said fitting comprising a first body section defining a fluid flow passage between said openings, and at least a second body section defining one of said openings, said first and second body sections being formed from dissimilar materials, with said first section having a yield strength that is less than that of said fluid flow guide structure, and said second section having a yield strength which is greater than that of said first section and which is comparable to that of said fluid flow guide structure, said second section peripherally surrounding and being fused at least mainly to an end portion of said first section to define therewith a composite fitting body, said second section having an end prepared for butt welding and configured to define a portion of an annular weld groove that is shaped to receive welding metal for welding said composite body to said fluid flow structure.

3. The fitting defined in claim 2 wherein said second section is formed from weld metal.

4. The fitting defined in claim 2 wherein said second section is formed with a substantially uniformly increasing wall thickness from its inner end to its outer butting end where it is adapted to be fused to said conduit structure by a butt weld.

5. The fitting defined in claim 3 wherein only the prepared, butt welding end of said second section extends axially beyond said end portion of said first section to define a continuation of said passage.

6. The fitting defined in claim 3 wherein said first section is a casting.

7. The fitting defined in claim 3 wherein said first section is a forging.

8. The fitting defined in claim 3 wherein a third weld metal section is fused to and peripherally surrounding another end portion of said first section to define the other of said fluid openings, said third section having an end prepared for butt welding to a further fluid flow conduit structure.

9. The fitting defined in claim 8 wherein said first, second, and third sections cooperate to define a valve body.

10. The fitting defined in claim 2 wherein said second section comprises an annulus of built-up weld metal joined to said first section by fusion welding.

11. A fitting having fluid inlet and outlet openings and comprising a first body section defining a fluid flow passage between said openings, and at least a second body section defining one of said openings and having an end prepared for butt welding to a fluid flow conduit structure, said first and second body sections being formed from dissimilar materials, with said second section being formed from weld metal and having a greater yield strength than that of said first section, said second section peripherally surrounding and being fused at least mainly to an end portion of said first section, along an annular interface tapering toward the outer butt welding end of said second section.

12. The fitting defined in claim 11 wherein the thicknesses of said first and second sections vary inversely along said interface.

13. The fitting defined in claim 11 wherein said second section is formed with a uniformly increasing thickness along said interface in a direction extending towards its butt welding end, and wherein said end portion is formed with a uniformly decreasing thickness along said interface in the direction of increasing thickness of said second section.

14. The fitting defined in claim 13 wherein the strength provided by the combined thicknesses of said first and second sections along said interface is constant.

15. The fitting defined in claim 13 wherein said end portion of said first section is formed with an internal cylindrical wall surface defining said flow passage and with an external wall surface extending along said interface and terminating substantially at a point of intersection with said internal cylindrical wall surface.

16. A method of making a fitting having fluid inlet and outlet openings comprising the steps of forming a body section with a fluid passage and with at least one end portion delimiting said passage and having an annular cross section of decreasing wall thickness towards its outer end, fusing a weld metal section of material dissimilar to said first section at least mainly to said end portion in peripherally surrounding relation thereto, extending said weld metal section axially beyond said end portion to define one of said openings, and preparing the outer end of said weld metal section for butt welding to a fluid flow conduit structure.

17. The method defined in claim 16 wherein said weld metal section is formed in situ by applying weld metal around the outer periphery of said end portion.

18. The method defined in claim 16 wherein said body section is formed by casting.

19. The method defined in claim 16 wherein said body section is formed by forging.

20. The method defined in claim 16 wherein the thickness of said weld metal section uniformly increases towards its outer, butt welding end.

21. The method defined in claim 20 wherein said end portion and said weld metal portion are provided with such thicknesses that the combined strength of said portion and said weld metal section in cross section is substantially constant along the entire interface where they are fused together.

References Cited

UNITED STATES PATENTS

| | | | |
|---|---|---|---|
| 918,926 | 4/1909 | Tanner | 285—286 |
| 1,613,461 | 1/1927 | Johnson | 285—286 X |
| 1,939,242 | 12/1933 | Thaheld | 285—286 X |
| 2,154,407 | 4/1939 | Miller | 285—286 X |
| 2,206,166 | 7/1940 | Dunn | 285—286 X |
| 2,257,335 | 9/1941 | Evans et al. | 285—286 |
| 2,289,271 | 7/1942 | Kane et al. | 285—172 X |
| 2,769,318 | 11/1956 | Grenell | 285—329 X |
| 1,939,772 | 12/1933 | Greene | 285—286 X |
| 2,555,256 | 5/1951 | Tyson | 285—286 |
| 2,763,923 | 9/1956 | Webb | 285—286 X |
| 2,787,699 | 4/1957 | Jessen | 285—286 X |
| 3,188,116 | 6/1965 | Christensen | 285—286 X |
| 3,392,994 | 7/1968 | Moore | 285—286 X |

FOREIGN PATENTS 1,179,772   10/1964   Germany.

REINALDO P. MACHADO, Primary Examiner

D. W. AROLA, Assistant Examiner

U.S. Cl. X.R.
29—481; 285—286

UNITED STATES PATENT OFFICE
CERTIFICATE OF CORRECTION

Patent No. 3,506,285            April 14, 1970

Nicholas F. Coates

It is certified that error appears in the above identified patent and that said Letters Patent are hereby corrected as shown below:

Column 2, line 14, "in" should read -- is --; line 46, "framentary" should read -- fragmentary --; line 49, "framentary" should read -- fragmentary --. Column 6, line 12, "P and S, max. -----0.20" should read -- P and S-----0.20 max. --; line 52, "filter" should read -- filler --.

Signed and sealed this 8th day of September 1970.

(SEAL)
Attest:

Edward M. Fletcher, Jr.            WILLIAM E. SCHUYLER, JR.
Attesting Officer                   Commissioner of Patents